(12) United States Patent
Ogura

(10) Patent No.: US 8,365,433 B2
(45) Date of Patent: Feb. 5, 2013

(54) APPARATUS AND METHOD FOR TREATING ORGANIC WASTE AND ORGANIC MATERIAL OBTAINED BY THE TREATMENT METHOD

(75) Inventor: Kunio Ogura, Iga (JP)

(73) Assignee: Kunitomo Kankyo Plant Co., Ltd., Iga-shi (JP)

( * ) Notice: Subject to any disclaimer, the term of this patent is extended or adjusted under 35 U.S.C. 154(b) by 751 days.

(21) Appl. No.: 12/450,272

(22) PCT Filed: Dec. 14, 2007

(86) PCT No.: PCT/JP2007/001402
§ 371 (c)(1),
(2), (4) Date: Nov. 16, 2009

(87) PCT Pub. No.: WO2008/117342
PCT Pub. Date: Oct. 2, 2008

(65) Prior Publication Data
US 2010/0092652 A1 Apr. 15, 2010

(30) Foreign Application Priority Data

Mar. 23, 2007 (JP) ................................. 2007-077483
Jun. 22, 2007 (JP) ................................. 2007-164444

(51) Int. Cl.
*F26B 25/04* (2006.01)
(52) U.S. Cl. .................. 34/339; 34/350; 34/90; 34/138; 110/229; 110/251; 48/197 R; 48/210; 122/7 R
(58) Field of Classification Search ................ 34/70, 80, 34/90, 138, 381, 413, 497, 339, 350; 110/229, 110/251; 48/197 R, 210; 122/7 R
See application file for complete search history.

(56) References Cited

U.S. PATENT DOCUMENTS

| 1,328,507 | A | * | 1/1920 | Fish, Jr. ........................... 34/350 |
| 4,013,590 | A | * | 3/1977 | Buonomo et al. ............ 502/263 |
| 5,335,425 | A | * | 8/1994 | Tomizawa et al. .............. 34/265 |
| 5,353,519 | A | * | 10/1994 | Kanamaru et al. ................ 34/92 |
| 5,763,722 | A | * | 6/1998 | Vic et al. ....................... 585/500 |
| 6,058,940 | A | * | 5/2000 | Lane ............................. 131/298 |
| 6,938,562 | B2 | * | 9/2005 | Pope ............................. 110/229 |
| 7,665,227 | B2 | * | 2/2010 | Wright et al. ................... 34/339 |

(Continued)

FOREIGN PATENT DOCUMENTS

DE 19901267 A1 * 7/2000
EP 575005 A1 * 12/1993

(Continued)

OTHER PUBLICATIONS

Sep. 29, 2009 International Preliminary Report on Patentability issued in International Application No. PCT/JP2007/001402.

*Primary Examiner* — Stephen M. Gravini
(74) *Attorney, Agent, or Firm* — Oliff & Berridge, PLC

(57) ABSTRACT

A technique by which various types of organic waste can be easily treated so as to obtain a reusable material. An apparatus is provided which comprises a vessel (20) for introducing organic waste (18) therein, the vessel being equipped with: stirring means (82), (92), and (98) for stirring the organic waste (18); steam supply means (62), (64), and (66) which supply high-temperature high-pressure steam to the vessel (20); evacuation means (77), (78), and (80) which evacuate the vessel (20); and heating means (24), (68), (64), and (66) which heat the organic waste (18) present in the vessel (20). The apparatus has such constitution, in which the organic waste (18) in the vessel (20) is decomposed by hydrolysis and pyrolysis and vacuum dried using those means.

12 Claims, 6 Drawing Sheets

U.S. PATENT DOCUMENTS

| | | | |
|---|---|---|---|
| 2005/0048121 A1* | 3/2005 | East et al. | 424/486 |
| 2010/0058609 A1* | 3/2010 | Taguchi | 34/443 |
| 2010/0199548 A1* | 8/2010 | del Cardayre et al. | 44/388 |
| 2011/0308147 A1* | 12/2011 | Rhatigan et al. | 44/605 |

FOREIGN PATENT DOCUMENTS

| | | | |
|---|---|---|---|
| GB | 186701930 A | * | 12/1867 |
| JP | 59196045 A | * | 11/1984 |
| JP | 01080488 A | * | 3/1989 |
| JP | 01217176 A | * | 8/1989 |
| JP | A-7-313959 | | 12/1995 |
| JP | A-10-85712 | | 4/1998 |
| JP | A-10-258265 | | 9/1998 |
| JP | A-2000-274941 | | 10/2000 |
| JP | A-2005-221158 | | 8/2005 |
| JP | A-2007-21410 | | 2/2007 |
| WO | WO 9825684 A1 | * | 6/1998 |

* cited by examiner

APPARATUS AND METHOD FOR TREATING ORGANIC WASTE AND ORGANIC MATERIAL OBTAINED BY THE TREATMENT METHOD

TECHNICAL FIELD

The present invention relates generally to an apparatus and method for treating organic waste and to an organic material; and particularly to an apparatus and method for treating organic waste through a decomposition process involving hydrolysis and pyrolysis as well as a vacuum drying process, and to an organic material obtained by such an organic waste treatment method.

BACKGROUND ART

In the past, incineration was the usual treatment employed for organic waste, specifically, so-called "living matter" including kitchen waste such as leftovers and food scraps (including bones, meat, organs, and vegetable scraps, as well as shells of shellfish and crustaceans), as well as biomass such as lawn, shrub, and tree clippings, chaff, sawdust, and wood chips; however, energy issues and environmental issues that have arisen in recent years now make urgent revaluation of such practices imperative.

In light of these issues, various measures for addressing these urgent problems have been proposed from different quarters, one of the most promising of which is one involving recycling of organic waste. This may involve, for example, reducing organic waste to block, granular, or powder form subsequent to a drying process, and reusing the dried product as organic material such as fertilizer or animal feed.

The use of a drying furnace to obtain such dried products is currently under consideration. Such drying furnaces are typically designed to carry out continuous drying of organic waste by high-temperature treatment through application of heat from outside the furnace to the material being treated, i.e. the organic waste, as the material is progressively transported through the furnace by a screw conveyor or the like.

However, organic waste drying processes such as this have a number of inherent drawbacks, such as: (1) the difficulty in achieving adequate drying; (2) the need for laborious operations to crush or mill the undried waste or dried product into granules or powder of appropriate size in order to reduce its volume; and (3) the final treated product is simply a dried product, and since proteins, carbohydrates, fats, and other nutrients remain present in macromolecular form in such dried products, when the dried product is reused as feed, fertilizer, a soil amendment or the like, the efficiency of absorption by livestock or plants will be low.

To address the aforementioned problem (1), it has been proposed to employ a vacuum dryer by way of a drying apparatus with higher capabilities (see Patent Citations 1 and 2 below, for example). However, even where organic waste drying treatment was carried out using such a vacuum dryer, the aforementioned problems (2) and (3) remained unresolved. Moreover, vacuum dryers have significant drawbacks, such as: (a) because treatment merely involves forced evaporative drying of moisture from the material being dried, complete drying does not take place, and for example if a dried product such as kitchen waste is left in an uncontrolled environment, it may reabsorb moisture and revert to its original state, with spoilage advancing as a result; and (b) vacuum drying cannot be used, for example, for highly moisture-retaining products such as seaweed (e.g. kelp) or fermented soybeans; synthetic polymer compounds in shampoos, detergents and the like; dairy products such as milk; high fat foods such as fish with high fat content; as well as products with high starch content.

Thus, as it stands currently, treatment of organic waste not only involves laborious effort, but depending on the type of organic waste, it can be difficult to treat the waste adequately to the point that it can be effectively recycled, and accordingly there exists a need for a technology whereby these problems can be resolved all at once.

Patent Citation 1: JP-A 10-85712
Patent Citation 1: JP-A 2005-221158

DISCLOSURE OF THE INVENTION

Problem the Invention Attempts to Solve

With the foregoing in view, it is one object of the present invention to provide a treatment apparatus and a treatment method for organic waste whereby it is possible for organic waste, regardless of type, to be adequately treated by a simple operation; and whereby there can be obtained treated products that are effectively recyclable as high-quality feed, fertilizer, or soil amendments. It is another object of the present invention to provide organic material obtained through such an organic waste treatment method.

Means for Solving the Problem

To address the problem, the inventors carried out various investigations from various angles with regard to a technology for achieving complete drying of organic waste. In the process, as a result of further intensive research with particular focus on organic waste composed of macromolecular compounds, it was discovered that by conducting drying treatment of such organic waste after first breaking these down into smaller molecules through decomposition by pyrolysis or hydrolysis, the organic waste can be completely dried out; and that moreover, due to the smaller molecules, utility value as a high-quality feed, fertilizer, soil amendment, or the like may be enhanced. The present invention was perfected on the basis of these discoveries.

The modes of the invention will be set forth below. The elements employed in the following modes of the invention may be adopted in any possible combination. It is to be understood that the modes and technical features of the invention are not limited to those disclosed herein, but may otherwise be recognized based on the teachings of the present invention disclosed in the entire specification and drawings, or that may be recognized therefrom by those skilled in the art.

In order to address the problems relating to apparatus for treating organic waste discussed above, a first mode of the invention provides an apparatus for treating organic waste comprising: (a) a vessel having a hermetically sealable introduction port and discharge port, and adapted to hold organic waste that has been introduced therein through the introduction port; (b) stirring means adapted to stir the organic waste held in the vessel; (c) steam supply means for supplying high-temperature, high-pressure steam to the vessel; (d) heating means adapted to heat the organic waste held in the vessel; and (e) evacuation means adapted to evacuate the vessel, under conditions where the organic waste is held inside the vessel and the introduction port and discharge port are hermetically sealed; the apparatus being of a constitution such that either decomposition treatment whereby the organic waste held in the hermetically sealed vessel is brought into contact with the high-temperature, high-pressure steam to bring about hydrolysis and pyrolysis while being stirred, or vacuum drying treatment whereby with the hermetically sealed vessel interior having been evacuated the organic waste held in the hermetically sealed vessel is heated and dried while being stirred, may be carried out selectively; or both the decomposition treatment and the vacuum drying treatment may be carried out in succession.

According to the present mode, through the introduction of high-temperature, high-pressure steam into the hermetically sealed vessel, the vessel interior can be brought to high temperature and high pressure in the presence of an ample amount of water (steam) to produce a so-called subcritical state. By stirring the organic waste and bringing it into contact with high-temperature, high-pressure steam in such an environment, it is possible to more efficiently break down molecules in the organic waste through hydrolysis and pyrolysis. In order to advantageously bring about this subcritical state, it will be preferable to employ saturated water vapor containing ample moisture as the high-temperature, high-pressure steam for introduction into the vessel.

Additionally, according to the present mode, after the organic waste has undergone decomposition treatment through contact with high-temperature, high-pressure steam, the decomposition product can be subjected to vacuum drying. For this reason, even for organic waste that was difficult to dry to an adequate extent with conventional vacuum drying apparatus, it will be possible for the material to undergo complete drying regardless of the type of waste, thus effectively preventing moisture from returning into the dried product and the resultant advance of spoilage.

Moreover, according to the present mode, by subjecting organic waste to decomposition treatment such as hydrolysis and pyrolysis prior to carrying out vacuum drying treatment, the drying process can take place with the molecular structure of the organic waste in a state of decomposition. For this reason, in contrast to the case where only vacuum drying treatment is carried out on organic waste, the treated product that is ultimately obtained may be rendered into sufficiently smaller or finer form, as compared with the form of untreated organic waste from which moisture has been simply eliminated. Consequently, it will be possible to advantageously dispense with crushing or milling machines required as auxiliary equipment as a matter of course in conventional vacuum drying systems, and used for reducing volume of the material. As a result, treated products that are completely dried and have sufficiently reduced volume can be obtained by a simple procedure, and at lower cost.

Further, in the present mode, the treated product that has been vacuum dried subsequent to decomposition treatment contains smaller molecules, so that, for example, proteins, carbohydrates, fats and the like that were present in the original organic waste will be present in the treated product in the form of amino acids, various sugars, fatty acids, and so on. The treated product will therefore be absorbed with exceptional efficiency by livestock or plants, and moreover will allow microbes that are useful to plants or animals to proliferate easily, making it advantageous for use as a high-quality organic material such as a feed, fertilizer, or soil amendment. Moreover, where the final treated product will be used as organic material in this way, it will be a simple matter to obtain organic materials utilizable for different desired purposes, merely through appropriate modification beforehand of the composition of the organic waste to be treated.

Additionally, according to the present mode, by way of example it will be possible for treated products that merely by decomposition treatment by hydrolysis or pyrolysis of organic waste can only be obtained in liquid or gel form, to instead be obtained a granular or powder form through vacuum drying treatment carried out subsequent to the decomposition treatment. Thus, not only will final treated products have enhanced ease of handling, but where the organic waste consists of shells of crustaceans or shellfish, or kelp for example, by subjecting these types of organic waste to successive decomposition treatment and vacuum drying treatment, it will be possible through an exceedingly simple procedure and at lower cost to respectively recover, in powder form, chitosan from organic waste consisting of shells of crustaceans, natural calcium from organic waste consisting of shellfish, or kelp extract from organic waste consisting of kelp. It will thus be possible to reuse the organic waste as an exceedingly useful resource.

According to the present mode, successive decomposition and vacuum drying treatments of organic waste may take place in a single vessel. For this reason, in contrast to the case where, for example, decomposition treatment and vacuum drying treatment are carried out in separate equipment, the need for the organic waste to be transported between the two units during treatment is eliminated, and thus not only can operational efficiency of the treatment operations be effectively improved, but the time required from the start of the decomposition treatment to the end of the vacuum drying treatment can be advantageously reduced to levels not achievable with conventional apparatus. Moreover, as compared to the case where two different units, namely a decomposition treatment unit and a vacuum drying treatment unit, are employed, it will be possible to effectively achieve reductions in organic waste treatment costs and the cost of manufacture of the equipment per se, as well as to reduce space requirements for installation of the equipment.

Furthermore, by carrying out successive decomposition and vacuum drying treatments of the organic waste in a single vessel, the organic waste may be maintained at high temperature conditions from the start to the end of treatments, while preventing contact with the air. Thus, any pathogens, bacteria, viruses or the like that may have been present in the organic waste can be killed during treatment, while contamination of the product by pathogens, bacteria, viruses or the like during transition from the decomposition treatment to the vacuum drying treatment can be avoided before it occurs. Thus, quality can be improved further where the final treated product will be used as feed or fertilizer.

Additionally, the present mode can be employed when carrying out only hydrolysis and pyrolysis on organic waste, or when carrying out only vacuum drying treatment on organic waste. Thus, a single apparatus can assume all of the functions of a decomposition treatment apparatus for organic waste, a vacuum drying treatment apparatus for organic waste, and an apparatus for carrying out successive decomposition treatment and vacuum drying treatment of organic waste, and may advantageously be adapted to a design whereby these functions are selectable at random, so as to provide exceptional ease of use.

A second mode of the invention features an organic waste treatment apparatus according to the preceding first mode, further including steam venting means adapted to vent to an outside the high-temperature, high-pressure steam which has been supplied to the vessel interior by the steam supply means.

According to the present mode, the high-temperature, high-pressure steam inside the vessel can be vented to the outside by the steam venting means before complete hydrolysis or pyrolysis of the organic waste has taken place, that is, while decomposition treatment of the organic waste still incomplete for example. By then subjecting organic waste that has undergone such decomposition treatment to vacuum drying treatment, there can be obtained a dried product in which the original form of the organic waste is partially preserved, so that the final treated product can be rendered into clumps or granules of relatively large size. Also, by changing the timing for venting of the high-temperature, high-pressure steam inside the vessel, it will be possible to give the final product any desired size.

Further, a third mode of the invention features an organic waste treatment apparatus according to the preceding first or second mode wherein, with the organic waste held inside the vessel and the introduction port and discharge port hermetically sealed, the evacuation means is able to evacuate the vessel interior prior to supplying the high-temperature, high-pressure steam to the vessel interior by the steam supply means.

According to the present mode, high-temperature, high-pressure steam can be supplied with the vessel interior in an evacuated condition. Thus, the temperature of the vessel interior can be reliably brought up to a target temperature suitable for decomposition treatment of the organic waste and corresponding to the temperature of the high-temperature, high-pressure steam. As a result, decomposition treatment of the organic waste by hydrolysis and pyrolysis can be carried out in a shorter time, and with sufficient reliability.

Further, a fourth mode of the invention features an organic waste treatment apparatus according to any one of the first to third modes wherein the heating means is adapted to heat the organic waste held in the vessel by heating the vessel from the outside.

According to the present mode, as compared to the case where, for example, organic waste inside the vessel is heated directly using heating means installed in the vessel interior, the limited space inside the vessel can be utilized more effectively, and uneven heating of the organic waste inside the vessel can be prevented as practicably as possible.

A fifth mode of the invention features an organic waste treatment apparatus according to the preceding fourth mode wherein the heating means includes a cover vessel positioned enclosing the entire perimeter of the vessel so as to define a hermetic space around the outside face of the vessel; and a heating medium supply mechanism whereby a heating medium that is adapted to contact the outside face of the vessel and heat the vessel is supplied to the hermetic space between the cover vessel and the vessel through a supply port provided to the cover vessel.

According to the present mode, organic waste inside the vessel can be heated more evenly.

A sixth mode of the invention features an organic waste treatment apparatus according to the preceding fifth mode wherein water vapor is used as the heating medium.

According to the present mode, as compared to the case where the vessel is heated from the outside by a burner or an electric heater, not only will it be possible to more evenly heat up the vessel as well as the organic waste held therein, but it will be possible to advantageously realize cost reductions due to the reduced amount of fuel required for heating, as well as lower carbon dioxide emissions associated with burning of fuels.

A seventh mode of the invention features an organic waste treatment apparatus according to any one of the preceding first to sixth modes wherein the vessel has a round tubular chassis that extends in the horizontal direction, with the introduction port opening upward in the round tubular chassis of the vessel and being hermetically closeable by a lid and with the discharge port opening downward at an axial end of the round tubular chassis and hermetically closeable by a lid; and is additionally furnished with position switching means adapted to switch positions of the vessel between a position in which the round tubular chassis extends on the horizontal, and a position in which the round tubular chassis is inclined downward towards the discharge port end.

According to the present mode, because the vessel has a round tubular chassis, the vessel designed to hold the organic waste will have unchanging diameter over its entire length; and as compared to the case where the center section is larger in diameter than the two end sections, with organic waste being held inside the vessel, headspace of unchanging dimensions will be provided across the entire length of the upper part of the vessel, thereby making it possible for the entire volume of organic waste inside the vessel to be stirred adequately, while effectively utilizing the entire vessel. As a result, more efficient and uniform treatment of the organic waste will be possible. Moreover, because the bottom face of the vessel extends on the horizontal, situations where stirring becomes difficult due to partial shifting of the organic waste inside the vessel may be advantageously avoided.

Additionally, because the introduction port opens upward in the round tubular chassis of the vessel and is hermetically closeable by a lid, while the discharge port opens downward at an axial end of the round tubular chassis and is hermetically closeable by a lid, introduction of organic waste into the vessel and discharge from the vessel can be carried out more easily.

Further, because position switching means have been provided for switching the position of the vessel between a position in which the round tubular chassis extends on the horizontal, and a position in which the round tubular chassis is inclined downward towards the discharge port end, it will be possible for the vessel to be positioned on the horizontal during the stirring process of the organic waste inside the vessel, or for the vessel to be downwardly inclined towards the discharge port end when retrieving the organic waste from the vessel interior. Consequently, while ensuring that the organic waste inside the vessel is sufficiently and effectively stirred, it will be possible for the procedure of retrieving the organic waste from inside the vessel subsequent to the stirring process to take place even smoother and faster.

In the present mode, while no particular limitation is imposed as to the location for situating the introduction port, in preferred practice it will be situated at the other axial end of the round tubular chassis of the vessel, that is, at the end on the opposite side from the axial end where the discharge port has been situated; an arrangement whereby the organic waste can be evenly accommodated along the entire length of the vessel can be advantageously realized thereby.

In order to address the problems relating to methods for treating organic waste discussed above, an eighth mode of the invention provides a method for treating organic waste comprising the steps of: (a) placing organic waste inside a hermetically sealable vessel; (b) carrying out decomposition treatment through hydrolysis and pyrolysis of the organic waste by supplying high-temperature, high-pressure steam to the hermetically sealed vessel interior and bringing about contact between the organic waste and the high-temperature, high-pressure steam, as the organic waste held in the vessel interior is being stirred; and (c) carrying out vacuum drying treatment by first evacuating the interior of the hermetically sealed vessel that holds the organic waste having undergone the decomposition treatment, then heating and drying as the organic waste inside the vessel is stirred.

According to the present mode, once the organic waste has undergone decomposition treatment to break down molecules through hydrolysis and pyrolysis, the decomposition product can then be vacuum dried. For this reason, even for organic waste that was difficult to dry to an adequate extent through conventional vacuum drying alone, complete drying can be achieved easily regardless of the type of waste; and the final treated product will exhibit exceptionally efficient absorption by livestock or plants, and moreover will allow microbes that are useful to plants or animals to proliferate easily, making it advantageous for use as a high-quality organic material such as a feed, fertilizer, or soil amendment.

A ninth mode of the invention features an organic waste treatment method according to the preceding eighth mode further including a step of evacuating the vessel interior after the organic waste has been placed in the vessel interior, and before supplying the high-temperature, high-pressure steam to the hermetically sealed vessel interior.

According to the present mode, high-temperature, high-pressure steam can be supplied to the evacuated vessel interior. Thus, the temperature of the vessel interior can be reliably brought up to a target temperature suitable for decomposition treatment of the organic waste and corresponding to the temperature of the high-temperature, high-pressure steam. As a result, decomposition treatment of the organic waste by hydrolysis and pyrolysis can be carried out in a shorter time and in a reliable manner.

Further, a tenth mode of the invention features an organic waste treatment method according to the preceding eighth or ninth mode wherein subsequent to termination of decomposition treatment of the organic waste upon hydrolysis and pyrolysis of the organic waste having gone to completion, a vacuum drying process is carried out on the decomposed organic waste.

According to the present mode, the final product obtained by successively carrying out a decomposition treatment and a vacuum drying process can be obtained as a dried product of powder form, whereby the final product may be effectively reduced in volume to an adequate extent.

Still further, an eleventh mode of the invention features an organic waste treatment method according to the preceding eighth or ninth mode wherein, after terminating the decomposition treatment of the organic waste at any point in time prior to hydrolysis and pyrolysis of the organic waste having gone to completion, a vacuum drying process is carried out on the decomposed organic waste.

According to the present mode, there can be obtained a dried product in which the original form of the organic waste is partially preserved, so that the final treated product can be rendered into clumps or granules of relatively large size, for example. The final product can therefore by effectively recycled as feed suitable for large domesticated animals, for example.

In order to address the problems relating to the organic material discussed above, a twelfth mode of the invention provides an organic material comprising a vacuum dried product obtained by the organic waste treatment method according to the preceding seventh to eleventh modes.

According to the present mode, materials can be utilized very effectively as high quality feed, fertilizer, soil amendments or the like.

Effect of the Invention

As will be appreciated from the above description, with the apparatus and method for treating organic waste in accordance with the present invention, organic waste regardless of the type thereof can be treated adequately by a simple procedure, and moreover there can be obtained treated products that are advantageously recyclable as high quality feed, fertilizer, soil amendments or the like. Likewise, the organic material in accordance with the present invention can be utilized very effectively as high quality feed, fertilizer, soil amendments or the like.

KEY TO SYMBOLS

8: treatment apparatus; 12: container unit; 18: organic waste; 20: vessel; 22: cover vessel; 24: jacket portion; 28: chassis portion; 38: introduction port; 40: discharge port; 62: steam injection pipe; 64: steam generator unit; 66: steam flow line; 68: steam supply pipe; 76: exhaust pipe; 77: branch pipe; 78: air intake line; 80: evacuation pump; 82: rotating shaft; 92: drive motor; 98: rotating blades

BEST MODE FOR CARRYING OUT THE INVENTION

In order to provide a fuller understanding of the present invention, the embodiments of the invention will be described in detail below with reference to the accompanying drawings.

Figure 1:
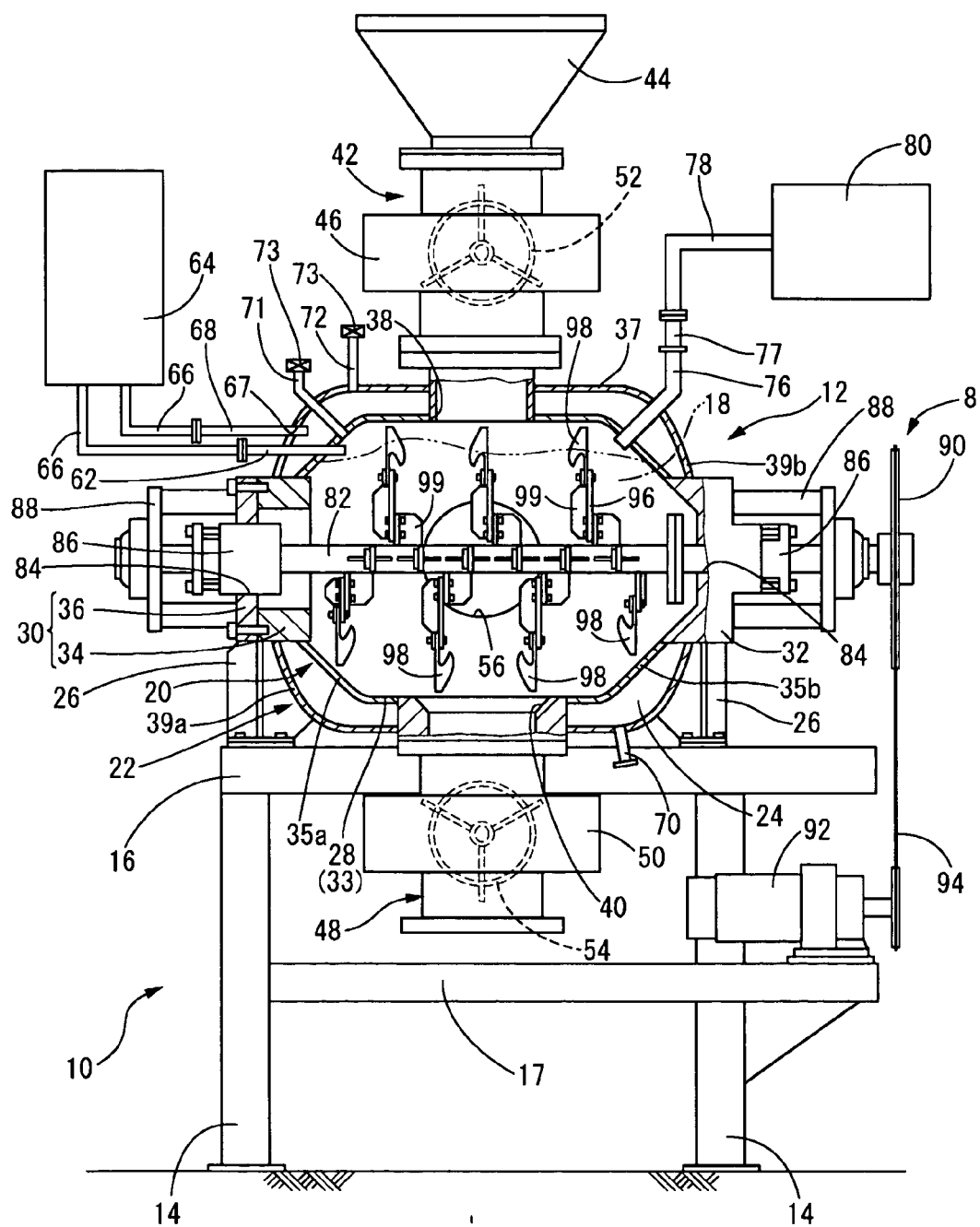
FIG. 1 It is a front view depicting an embodiment of an organic waste treatment apparatus according to the invention, including a partially cutaway view.
Figure 2:
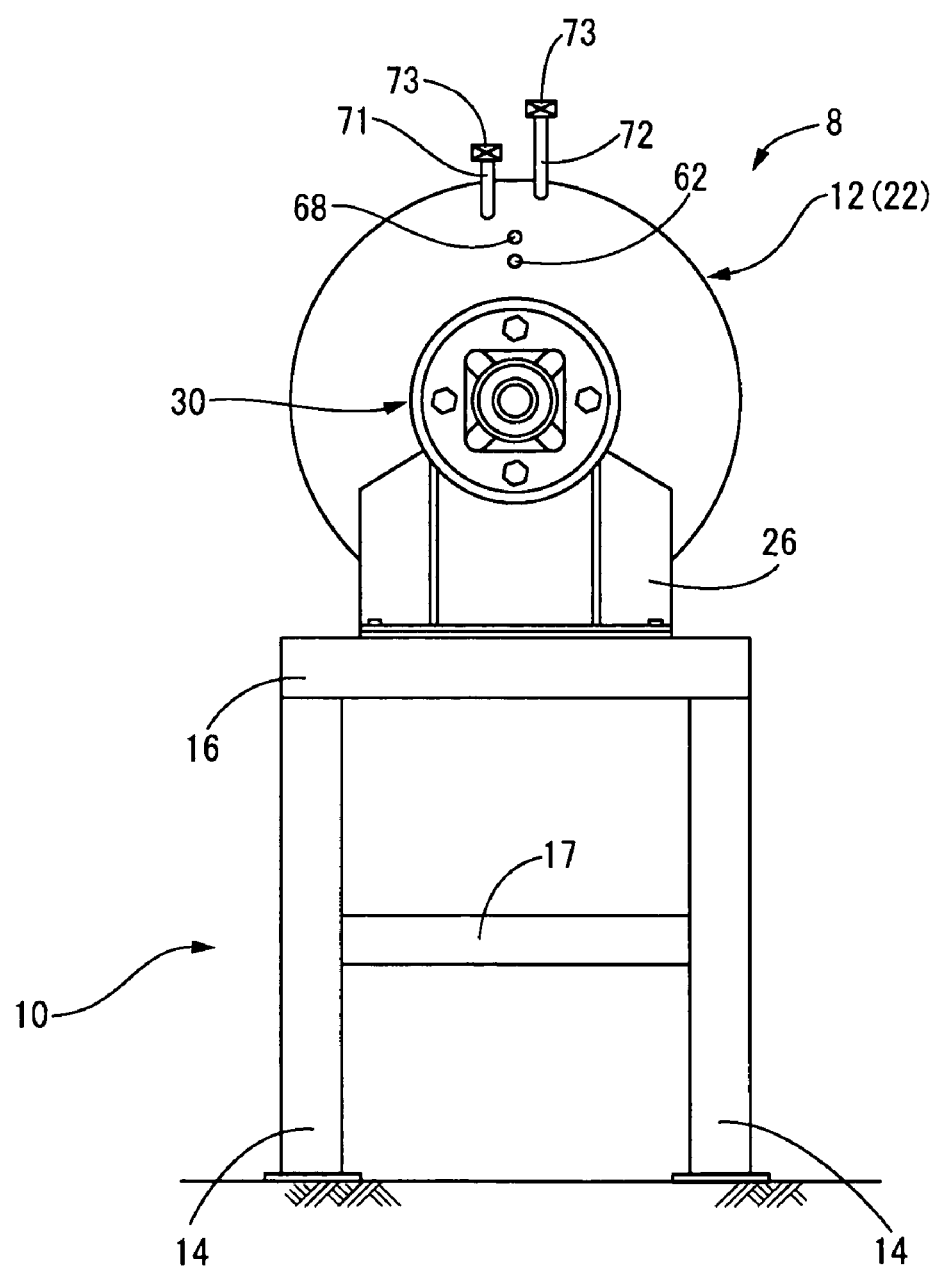
FIG. 2 It is a left side view depicting the treatment apparatus of FIG. 1.
Figure 3:
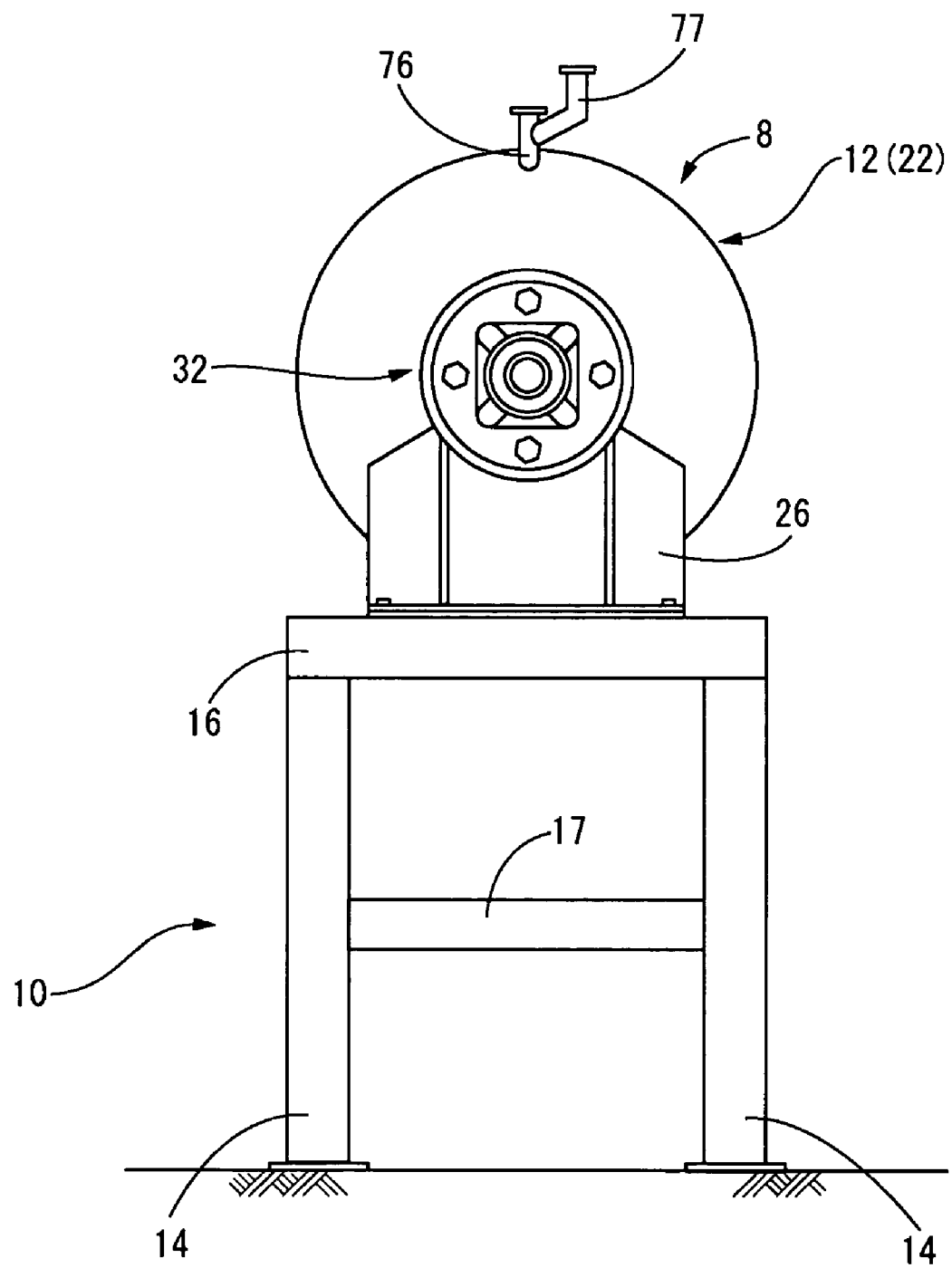
FIG. 3 It is a right side view depicting the treatment apparatus of FIG. 1.

First, FIGS. 1 to 3 depict in simplified form an embodiment of an apparatus for treating organic waste having a structure according to the invention, shown in front view and in left and right side view respectively. As will be apparent from these drawings, the treatment apparatus 8 of the present embodiment has a base 10 and a container unit 12 that is supported on this base 10.

More specifically, the base 10 is composed of four legs 14 and an upper frame 16 of rectangular frame shape secured to the tops of the legs 14.

Meanwhile, the design of the container unit 12 includes a vessel 20 adapted to hold organic waste 18 (represented by double-dot and dash lines in FIG. 1) in its interior, and a cover vessel 22 arranged enclosing the entire outside peripheral face of this vessel 20. The vessel 20 and the cover vessel 22 are both of horizontally elongated tank form overall, constructed of heat- and corrosion-resistant steel plate, with the cover vessel 22 being of slightly larger dimensions than the vessel 20 thereby forming between the outside peripheral face of the vessel 20 and the inside peripheral face of the cover vessel 22 a jacket portion 24 defined by a hermetic space that surrounds the entire outside of the vessel 20. In the present embodiment, in those zones of the vessel 20 in which parts such as an introduction duct 42 and a steam injection pipe 62 (these will be discussed later) have been formed, the cover vessel 22 has been joined fluidtightly to the outside wall of the introduction duct 42 etc. by welding or the like; however, by way of an alternative construction, an arrangement whereby, for example, a member passing in and out of the introduction duct 42 etc. and produced by bending of the cover vessel 22 towards the vessel 20 in proximity to the formation zone of the introduction duct 42 etc. so that the edge of the cover vessel 22 joins directly to the outside wall of the vessel 20 could be attached to either the vessel 20 or the cover vessel 22, but not directly attached to both, would be acceptable as well. Employing this type of construction can advantageously prevent problems such as cracking caused by stress concentrations and the like which may occur in joined portions of the cover vessel 22 and the introduction duct 42 etc. under conditions of repeated thermal expansion of the cover vessel 22 due to introduction of high-temperature, high-pressure steam.

At each of the two ends of the cover vessel 22 in the axial direction (corresponding to the left and right sides in FIG. 1 and hereinafter termed the left side and right side) a single integrally formed support bracket 26 extends downwardly, with the support brackets 26 being anchored to the top of the upper frame 16 of the base 10. In this way, the container unit 12 is securely supported on the upper frame 16 of the base 10 and positioned parallel thereto (i.e. on the horizontal).

The vessel 20 additionally has a chassis portion 28 opening towards both sides in the axial direction, and two closure members 30, 32 adapted to close off the openings of the chassis portion 28. The axial medial portion of the chassis portion 28 defines a tubular portion 33, while its end portions on the left and right sides respectively define left side and right side tapered tube portions 35a, 35b of progressively smaller diameter towards the outside in the axial direction.

Of these two closure members 30, 32, the left side closure member 30 adapted to close off the opening at the left side of the chassis portion 28 is composed of a mounting tube part 34 of thick-walled tubular shape extending integrally outward from the left side opening of the vessel 20, and a lid body 36 of thick circular disk shape adapted to be detachably mounted by bolts to the end face of this mounting tube part 34 at the side thereof that opens to the outside, so as to cover this opening. Thus, the left side opening of the vessel 20 (the chassis portion 28) may be opened or closed depending on whether the lid body 36 of the left side closure member 30 is attached or detached to the mounting tube part 34. A heat-resistant sealing member, not shown, is interposed between the lid body 36 and the mounting tube part 34 to ensure a liquid-tight and gas-tight seal between the lid body 36 and the mounting tube part 34.

On the other hand, the right side closure member 32 adapted to close off the opening at the right side of the chassis portion 28 is composed of a generally thick circular disk member affixed at the outside peripheral face at one end thereof to the inside peripheral face of the right side opening of the chassis portion 28. Thus, the right side opening of the vessel 20 (the chassis portion 28) is permanently closed.

The cover vessel 22 which is arranged enclosing the outside of the vessel 20 is composed exclusively of a chassis section of tubular shape open at both its left and right sides, with the axial medial portion thereof defining a tubular portion 37 that is slightly larger than the tubular portion 33 of the vessel 20, and the ends at both the left and right sides defining left side and right side tapered tube portions 39a, 39b of tapered tube shape slightly larger than the tapered tube portions 35a, 35b of the vessel 20. The inside peripheral face of the left side opening of the left side tapered tube portion 39a of this chassis section is anchored to the outside peripheral face of the mounting tube part 34 of the left side closure member 30, while the inside peripheral face of the right side opening of the right side tapered tube portion 39b is anchored to the outside peripheral face of the disk-shaped right side closure member 32. The openings at the left and right sides of the cover vessel 22 are thereby permanently blocked off, and the jacket portion 24 that is defined between the inside peripheral face of the cover vessel 22 and the outside peripheral face of the vessel 20 is hermetically sealed off from the outside.

The chassis portion 28 of the vessel 20 constructed in this way is provided in the upper zone of the center of the tubular portion 33 with an introduction port 38 that opens towards the top, and in the lower zone thereof with a discharge port 40 that opens towards the bottom. The introduction port 38 connects to the introduction duct 42 which passes through the upper zone of the tubular portion 37 of the cover vessel 22 and extends upward with prescribed height. This introduction duct 42 is composed of a plurality of integrally connected segments, and is provided at its distal end with a hopper 44 for loading with the organic waste 18 that is to be treated; and in its medial portion with a ball valve 46 of known design adapted to fluidtightly close off the introduction port 38.

Meanwhile, the discharge port 40 connects to a discharge duct 48 that passes through the lower zone of the tubular portion 37 of the cover vessel 22 and extends downward with prescribed height. This discharge duct 48 is also composed of a plurality of integrally connected segments and is provided in its medial portion with a ball valve 50 of known design adapted to fluidtightly close off the discharge port 40. The ball valves 46, 50 disposed in the introduction duct 42 and the discharge duct 48 are readily opened and closed by rotating handles 52, 54 respectively provided to them. In place of the manual opening and closing mechanisms that rely on the rotating handles 52, 54, these ball valves 46, 50 could instead be provided with automatic opening and closing mechanisms employing an actuating source such as hydraulic oil or air.

Thus, with the ball valve 50 of the discharge duct 48 having been placed in the closed position, operation of the rotating handle 52 to actuate opening of the ball valve 46 of the introduction duct 42 will allow the organic waste 18 that has been loaded into the hopper 44 to be introduced and placed into the vessel 20 through the introduction duct 42 and the introduction port 38. Or, with organic waste 18 thusly held inside the vessel 20, operation of the rotating handle 54 to actuate opening of the ball valve 50 of the discharge duct 48 will allow the organic waste 18 inside the vessel 20 to be discharged to the outside of the vessel 20 through the discharge port 40 and the discharge duct 48. Further, with the organic waste 18 inside and the ball valves 46, 50 of the introduction duct 42 and the discharge duct 48 in the closed position, the interior space of the vessel 20 will be hermetically sealed in fluidtight fashion, and will be able to sufficiently withstand increases and decreases in internal pressure as well.

A maintenance/inspection manhole 56 passes through a zone in the side part of the center of the tubular portion 33 of the chassis portion 28 of the vessel 20. This maintenance/inspection manhole 56 has a circular shape of a size such that the upper torso of a person can pass through. At the edge of the opening of the maintenance/inspection manhole 56 at on the outside face of the tubular portion 33 of the chassis portion 28 there is integrally formed a tube portion 58 that encircles the maintenance/inspection manhole 56 and extends out sideways; a reclosable hatch 60 is attached for covering the distal opening of the tube portion 58 (see FIG. 4).

Through this arrangement, the maintenance/inspection manhole 56 can be opened or closed as needed through operation of the hatch 60 to open or close it; in particular, when the hatch 60 is open, it will be possible for an operator to slide his upper torso into the vessel 20 through the maintenance/inspection manhole 56 to perform tasks inside the vessel 20.

The hatch 60, having been positioned covering the distal opening of the tube portion 58, will be disposed in intimate contact against the rim edge of the tube portion 58 via a heat-resistant seal member (not shown), thus affording a design whereby the maintenance/inspection manhole 56 may be hermetically sealed fluidtightly through closure of the hatch 60. The hatch 60 in the closed position is secured with bolts to the rim edge of the tube portion 58, whereby the hatch 60 may be reliably maintained in the closed position during increases and decreases in internal pressure of the vessel 20.

As will be apparent from FIGS. 1 and 2, the steam injection pipe 62 is attached at a zone in the upper part of the left side tapered tube portion 35a in the chassis portion 28 of the vessel 20, and passes respectively through the left side tapered tube portion 35a of the chassis portion 28 and the left side tapered tube portion 39a of the cover vessel 22 so that the interior of the vessel 20 and the exterior of the cover vessel 22 (the container unit 12) communicate with one another. Specifically, this steam injection pipe 62 is made of a round pipe having relatively short length and small diameter, a first lengthwise end of which intrudes into the interior of the vessel 20, with the opening at this first lengthwise end opening into the interior of the vessel 20 and with the opening at the other end positioned so as to open to the outside of the cover vessel 22. A steam generator unit 64, such as a boiler adapted to generate high-temperature, high-pressure steam, is connected via a steam flow line 66 to the outside-leading open end of this steam injection pipe 62. The coupling section of the steam injection pipe 62 to the steam flow line 66 is furnished with an electromagnetic on-off valve (not shown) for example.

As will be appreciated from FIGS. 1 and 3, an exhaust pipe 76 is attached at a zone in the upper part of the right side tapered tube portion 35b in the chassis portion 28 of the vessel 20, and passes respectively through the right side tapered tube portion 35b and the right side tapered tube portion 39b of the cover vessel 22 so that the interior of the vessel 20 and the exterior of the cover vessel 22 (the container unit 12) communicate with one another. Specifically, this exhaust pipe 76 is made of a round pipe having relatively short length and small diameter, a first lengthwise end of which intrudes into the interior of the vessel 20, with the opening at this first lengthwise end opening into the interior of the vessel 20 and with the opening at the other end is positioned so as to open to the outside of the cover vessel 22. The outside opening of this exhaust pipe 76 is provided with an electromagnetic on-off valve (not shown) for example. Here, the exhaust pipe 76 opens directly into the atmosphere via the on-off valve (not shown); however, a silencer, odor eliminator, and the like could be installed at the outside opening if necessary. It should be understood that, in FIGS. 2 and 3, the introduction and discharge ducts 42, 48, the ball valves 46, 50, the hopper 44, and the hatch 60 which are provided to the container unit 12, as well as a drive motor 92 to be discussed later, may be dispensed with.

Here, high-temperature, high-pressure steam generated by the steam generator unit 64 is conducted through the steam flow line 66 and into the steam injection pipe 62 whose on-off valve (not shown) is in the open position, and is thereby supplied by being steam injected into the vessel 20 interior from the opening of the steam injection pipe 62 which leads into the vessel 20. By carrying out supply of high-temperature, high-pressure steam to the vessel 20 interior with the on-off valve (not shown) of the exhaust pipe 76 in the closed position, the interior of the vessel 20 will be brought to high-temperature, high-pressure conditions, and the organic waste 18 held inside the vessel 20 will be brought into contact with the high-temperature, high-pressure steam so that hydrolysis and pyrolysis of the organic waste 18 takes place inside the vessel 20. By then opening the on-off valve of the exhaust pipe 76, the high-temperature, high-pressure steam inside the vessel 20 may be discharged to the outside from the exhaust pipe 76, thus returning the vessel 20 interior to atmospheric pressure. From the above it will be appreciated that in the present embodiment the steam supply means is constituted of the steam injection pipe 62, the steam flow line 66, and the steam generator unit 64.

As shown in FIGS. 1 and 2, in the present embodiment, a steam supply port 67 is formed in a zone apart from the zone of passage of the steam injection pipe 62 in the left side tapered tube portion 39a of the cover vessel 22; and a steam supply pipe 68 made of a round pipe having relatively short length and small diameter similar to the steam injection pipe 62 is secured passing through this steam supply port 67. A first lengthwise end of this steam supply pipe 68 passes through the steam supply port 67 and intrudes into the interior of the cover vessel 22, with the opening at this first lengthwise end opening into the jacket portion 24 between the cover vessel 22 and vessel 20 and with the opening at the other end positioned so as to open to the outside of the cover vessel 22 (the container unit 12). The steam generator unit 64 connects via a branch of the steam flow line 66 to the outside-leading opening of this steam supply pipe 68 as well. The coupling section of the steam supply pipe 68 to the steam flow line 66 is furnished with an electromagnetic on-off valve (not shown) for example.

A drainpipe 70 that connects the interior of the jacket portion 24 to the outside is provided in a lower zone of the right side tapered tube portion 39b of the cover vessel 22. The outside opening of this drainpipe 70 is furnished with an electromagnetic on-off valve (not shown) for example.

Here, high-temperature, high-pressure steam generated by the steam generator unit 64 is conducted through the steam flow line 66 and into the steam supply pipe 68 whose on-off valve (not shown) is in the open position, and is thereby supplied into the jacket portion 24 from the steam supply pipe 68 opening that leads into the jacket portion 24. By carrying out supply of high-temperature, high-pressure steam to the jacket portion 24 interior while the on-off valve (not shown) of the drainpipe 70 is in the closed position, high-temperature, high-pressure steam will fill the interior of the jacket portion 24 and come into contact with the entire outside peripheral face of the chassis portion 28 of the vessel 20, thus heating the entire vessel 20, as well as heating from the outside the organic waste 18 held inside the vessel 20. Under these conditions, subsequent opening of the on-off valve of the drainpipe 70 will cause the high-temperature, high-pressure steam and drain water (condensation) inside the jacket portion 24 to be discharged to the outside through the drainpipe 70, whereupon the vessel 20 and the organic waste 18 which is housed therein will cool down. From the above it will be appreciated that, in the present embodiment, high-temperature, high-pressure steam constitutes the heating medium; the heating medium supply mechanism is composed of the steam supply pipe 68, the steam flow line 66, and the steam generator unit 64; and the heating means is composed of the cover vessel 22, the jacket portion 24, the steam supply pipe 68, the steam flow line 66, and the steam generator unit 64.

The chassis portion 28 of the vessel 20 and the chassis section of the cover vessel 22 whose interiors are supplied with high-temperature, high-pressure steam in the manner described above are respectively provided with vent lines 71, 72 that connect the vessel 20 interior and the cover vessel 22 interior (jacket portion 24 interior) to the outside. A safety valve 73 is provided to each of the outside openings of these vent lines 71, 72. The safety valves 73 are normally closed, but if the pressure inside the vessel 20 or inside the jacket portion 24 should rise to an abnormally high level, the valve will open when presented with an alert signal from a pressure sensor of known design (not shown). Thus, abnormal pressure inside the vessel 20 and inside the jacket portion 24 will be allowed to escape so that safety is assured. Here, in addition to the pressure sensor (not shown), there is also provided a pressure gauge (not shown) of known design adapted to sense pressure inside the vessel 20 based on an electrical signal from the pressure sensor, and a temperature gauge (not shown) of known design adapted to sense the temperature inside the vessel 20.

As will be appreciated from FIGS. 1 and 3, the exhaust pipe 76 which is provided to the chassis portion 28 of the vessel 20 is furnished in the section thereof that projects outward from the container unit 12 with a branch pipe 77. An air intake line 78 is connected to this branch pipe 77 via an electromagnetic on-off valve (not shown) for example. At the end on the side opposite the side connecting to the branch pipe 77, this air intake line 78 connects to a evacuation pump 80 such as a vacuum pump having a known design.

Thus, with the on-off valve on the branch pipe 77 in the open position, in response to operation of the evacuation pump 80 the air inside the vessel 20 will be discharged to the outside through a segment of the exhaust pipe 76 up to midpoint, the branch pipe 77, and the air intake line 78, to bring about a reduction in internal pressure of the vessel 20. From the above it will be appreciated that, in the present embodiment, the evacuation means is composed of the exhaust pipe 76, the branch pipe 77, the air intake line 78, and the evacuation pump 80.

Control of the extent of evacuation inside the vessel 20 resulting from operation of the evacuation pump 80 may be carried out through adjustment of the output of the evacuation pump 80. While this output adjustment may be performed manually, in the present embodiment, automatic control is carried out on the basis of sensor values for pressure inside the vessel 20 sensed by the pressure sensor and the pressure gauge to bring the system to preestablished target evacuation values; as these target evacuation values there may be employed a value whereby, after the organic waste 18 has been placed in the vessel 20 but before high-temperature, high-pressure steam has been introduced, the vessel 20 interior is brought to prescribed reduced pressure conditions, and a value whereby once the organic waste 18 has undergone hydrolysis and pyrolysis inside the vessel 20 as described later, the vessel 20 interior is placed under essentially vacuum conditions. Thus, after organic waste 18 has been placed inside the vessel 20 but before high-temperature, high-pressure steam has been introduced, the vessel 20 interior is automatically brought to prescribed reduced pressure conditions; and after decomposition treatment of the organic waste 18 as described later, is automatically placed under vacuum conditions. With the vessel 20 interior under such vacuum conditions, the vessel 20 will then be heated by supplying steam to the jacket portion 24 interior so that vacuum drying of the organic waste 18 held in the interior of the vessel 20 may be carried out.

Here, after organic waste 18 has been placed inside the vessel 20 but before high-temperature, high-pressure steam has been introduced, once the pressure inside the vessel 20 has reached the target evacuation value the evacuation pump 80 will be stopped, and the on-off valve on the branch pipe 77 will be shut so that the evacuation pump 80 is cut off from the interior of the vessel 20. Thus, high-temperature, high-pressure steam will be prevented from leaking out to the evacuation pump 80 during subsequent introduction of high-temperature, high-pressure steam into the vessel 20. Also, during evacuation of the vessel 20 interior, the on-off valves respectively provided to pipes other than the branch pipe 77, namely, to the steam injection pipe 62, the steam supply pipe 68, the exhaust pipe 76, and the drainpipe 70, will all be closed, providing an arrangement whereby evacuation may be carried out efficiently.

A rotating shaft 82 is arranged in the interior of the vessel 20. This rotating shaft 82 has length exceeding by prescribed dimensions the axial length of the vessel 20. This rotating shaft 82 extends along the horizontal so as to traverse the interior of the vessel 20 at a location concentric to the vessel 20, and passes respectively through the left side closure member 30 and the right side closure member 32 which respectively close off the left side and right side openings of the vessel 20 (the chassis portion 28) so that the two ends thereof are axially supported with respect to the left side and right side closure members 30, 32 while respectively projecting to the outside.

Specifically, through-holes 84 are respectively provided to the center part of the lid body 36 of the left side closure member 30 and to the center part of the right side closure member 32. Heat-resistant gland gaskets 86 are respectively slipped into and clenched fast within the through-holes 84. Support frames 88 have been respectively affixed to the lid body 36 of the left side closure member 30 and to the end face of the right side closure member 32 on the side thereof opposite from the chassis portion 28 side, so as to girdle the gland gaskets 86 from the outside. The respective ends located at either side of the rotating shaft 82 and projecting out from the vessel 20 interior are slidably passed through the inside of the gland gaskets 86, and are supported on the support frames 88 through the agency of bearings. Thus, the rotating shaft 82 is rotatably supported vis-à-vis the left side and right side closure members 30, 32 respectively, under conditions such that sufficient gas-tightness, liquid-tightness, and pressure resistance are assured in the zones of passage of the rotating shaft 82 through the closure members 30, 32. In the present embodiment, by employing such seal structures that use heat-resistant gland gaskets 86, it will be possible to advantageously maintain sealing in the gaps between the vessel 20 interior at high temperature and pressure, and the passage zones of the slidably rotating rotating shaft 82. That is, if a mechanical seal structure that uses for example rubber gaskets is employed, frequent replacement of the sealing members, e.g. rubber gaskets, will be necessary; whereas according to the present embodiment, gas-tightness, liquid-tightness, and pressure resistance on the part of connecting portions may be readily assured through simple maintenance practices to appropriately replace the gland gaskets 86.

Also, in the present embodiment, because one end of the rotating shaft 82 is supported by the lid body 36 of the left side closure member 30 which has been detachably mounted onto the chassis portion 28 of the vessel 20 in this way, the rotating shaft 82 can be withdrawn from the vessel 20 interior together with the lid body 36, by detaching the lid body 36 with the rotating shaft 82 supported thereon from the chassis portion 28.

Additionally, a sprocket 90 is mounted on the distal end of the rotating shaft 82 at the end thereof that passes through and projects to the outside of the right side closure member 32 which supports the shaft and which has been affixed to the chassis portion 28 of the vessel 20. This sprocket 90 is linked via a chain 94 to the rotating shaft of the drive motor 92 which has been secured to a lower frame 17 of the base 10. Through this arrangement, the rotating shaft 82 will turn in association with rotary driving of the drive motor 92.

Figure 4:
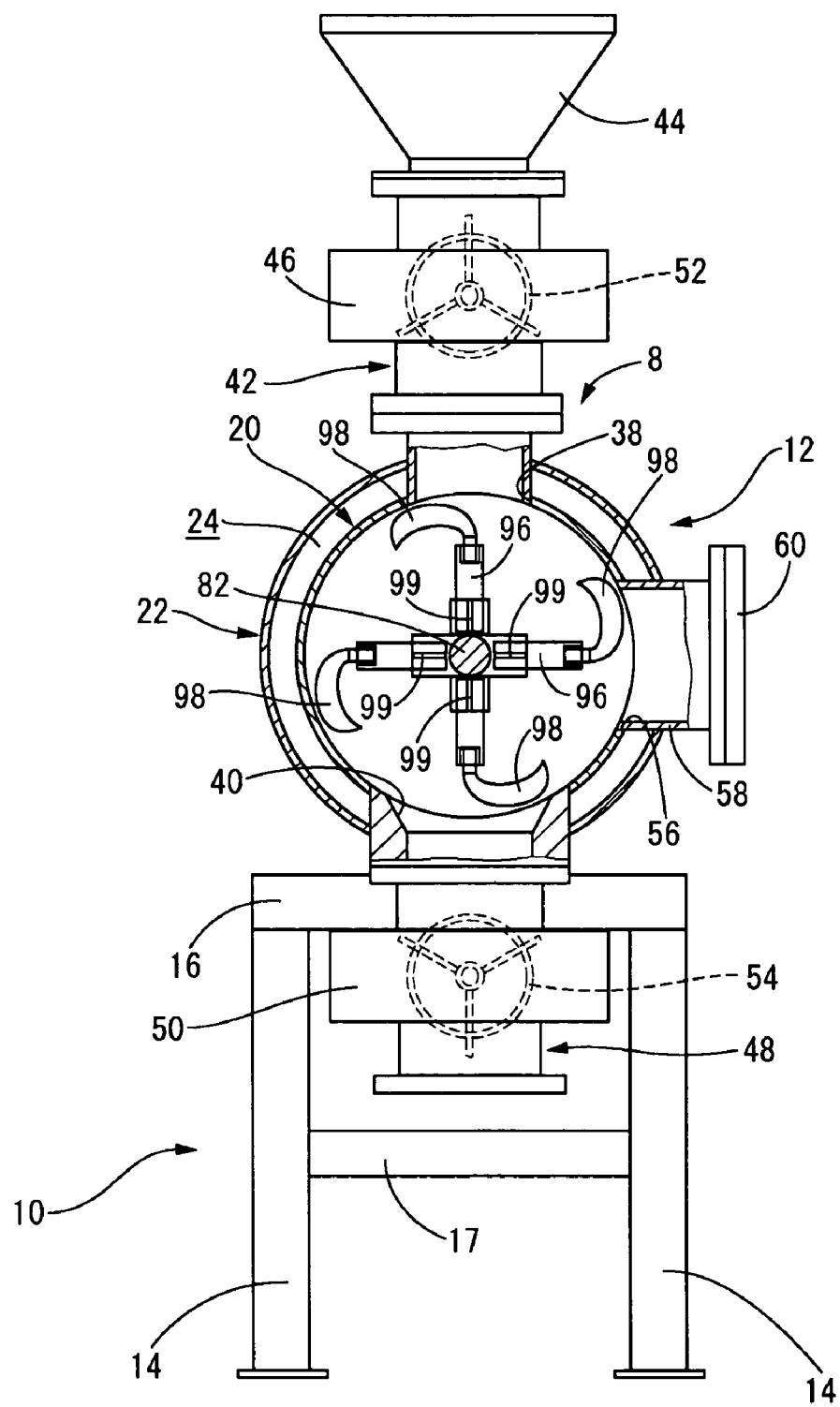
FIG. 4 It is an illustration along the IV-IV cross section of FIG. 1, including a partially cutaway view.

As shown in FIGS. 1 and 4, a plurality of mounting plates 96 of flat plate shape having prescribed length are arranged on the outside peripheral face of the rotating shaft 82 in its axial medial section which is positioned in the vessel 20 interior, and respectively project integrally upright therefrom and diametrically outward at locations having a 90° phase difference from one another in the circumferential direction and spaced apart by a prescribed distance in the axial direction. A single rotating blade 98 is mounted on the distal edge of each of the mounting plates 96. Each of the rotating blades 98, which are composed of flat plates of generally crescent shape, is positioned extending along a curving path in one direction around the rotating shaft 82 and twisted slightly to one side in the axial direction of the rotating shaft 82, and in this state is bolted at one lengthwise edge thereof to the distal edge of one of the mounting plates 96. Of the plurality of rotating blades 98, those situated to the left side of the center of the rotating shaft 82 and those situated to the right side twist in mutually opposite directions. Further, in the lengthwise medial portion of each mounting plate 96, a fin 99 of thin, flat plate shape adapted to augment the rotating blades 98 is arranged integrally upright from one face of the mounting plate 96 so that the direction of thickness is orthogonal thereto.

The rotating blades 98 are thereby mounted so as to be easily detachable from the rotating shaft 82, and in association with rotary driving of the drive motor 92 will rotate in unison with the rotating shaft 82. As will be discussed later, with organic waste 18 placed inside the vessel 20, the organic waste 18 may be stirred efficiently and reliably through rotation in unison with the rotating shaft 82 together with the fins 99. From the above it will be appreciated that here, the stirring means is composed of the rotating shaft 82, the plurality of rotating blades 98, the sprocket 90, the chain 94, and the drive motor 92.

During treatment of organic waste using the treatment apparatus 8 of the present embodiment constructed as described above, following an operating procedure such as that described below for example, decomposition treatment will first be carried out on the organic waste, followed by vacuum drying treatment of the decomposition product.

Specifically, the first task is to prepare the organic waste 18 for treatment; here, there is prepared organic waste 18 for treatment that includes, for example, chaff, straw, rush grass, scrap wood, sawdust, livestock manure, dead fish, trimmings (including bones, meat, guts, etc.), shellfish, shells of crustaceans, paper scraps, vegetable scraps, and discarded food contained in industrial waste emitted by industries such as the agriculture, forestry, livestock, fishing, or food processing industries, or in garbage from stores, businesses, and ordinary residences, as well as organic sludge from wastewater.

Once the organic waste 18 has been prepared, the rotating shaft 82 and the plurality of rotating blades 98 are rotated in unison by rotary driving of the drive motor 92, and access to the introduction port 38 is opened by actuating opening of the ball valve 46 of the introduction duct 42. At this time, with the ball valve 50 of the discharge duct 48 kept closed, the discharge port 40 is shut. The on-off valves on all of the pipes that open into the vessel 20 interior and the cover vessel 22 interior are closed.

Next, the prepared organic waste 18 is loaded into the hopper 44, and the organic waste 18 is then loaded into the vessel 20 interior from the hopper 44 through the introduction port 38. At this time, because the rotating blades 98 situated to the left side of the center of the rotating shaft 82 and the rotating blades 98 situated to the right side thereof have mutually opposite directions of twist, the organic waste 18 that has been loaded into the center section of the vessel 20 will be progressively shifted towards the left and right sides inside the vessel 20 due to turning of the plurality of rotating blades 98 and the plurality of fins 99. The organic waste 18 will continue to be loaded into the vessel 20 interior until a prescribed volume is held therein.

Once the prescribed volume of organic waste 18 has been loaded into the vessel 20 interior, the ball valve 46 of the introduction duct 42 is shut, closing off the introduction port 38. The vessel 20 interior is thereby completely sealed off from the outside. Then, after opening the on-off valve on the branch pipe 77 of the exhaust pipe 76, the evacuation pump 80 is operated, thereby sucking out through the branch pipe 77 the air inside the vessel 20 as well as any air inside the organic waste 18 held in the vessel 20 interior, evacuating the interior of the vessel 20.

Preferably this evacuation procedure will continue until the pressure inside the vessel 20 reaches a value in a range of between about $5.33 \times 10^3$ and $10.7 \times 10^3$ Pa (between 40 and 80 Torr), more preferably between about $6.67 \times 10^3$ and $9.33 \times 10^3$ Pa (between 50 and 70 Torr), and still more preferably about $8.00 \times 10^3$ Pa (60 Torr). Once pressure inside the vessel 20 has reached a value in the desired range, the on-off valve of the branch pipe 77 is shut to maintain the reduced pressure state. During this evacuation procedure, rotation of the rotating shaft 82 and the rotating blades 98 by the drive motor 92 may be halted if necessary.

Next, with the vessel 20 interior having been evacuated to the desired level, by continuing to operate the drive motor 92 (if it has been operating continuously) or restarting it (if it was halted), the organic waste 18 inside the vessel 20 is stirred by the rotating blades 98 that rotate in unison with the rotating shaft 82, as well as by the fins 99. With the organic waste 18 being stirred in this manner, high-temperature, high-pressure steam generated by the steam generator unit 64 will be conducted towards the vessel 20 by the steam flow line 66 and injected into the vessel 20 interior from the steam injection pipe 62, bringing the vessel 20 interior to a state of high temperature and high pressure (substantially saturated water vapor), and bringing the high-temperature, high-pressure steam into contact with the organic waste 18 as it is being stirred. In this way, a decomposition treatment through hydrolysis and pyrolysis (steam digestion treatment) is carried out on the organic waste 18 inside the vessel 20. At this time, the on-off valve on the steam supply pipe 68 is closed so that high-temperature, high-pressure steam inside the steam flow line 66 will not be supplied to the jacket portion 24 interior through the steam supply pipe 68.

During this decomposition treatment carried out on the organic waste 18, the temperature of the high-temperature, high-pressure steam that is injected into the vessel 20 interior from the steam injection pipe 62 preferably will be between about 150 and 250° C., more preferably between about 180 and 220° C. The pressure inside the vessel 20 resulting from injection of high-temperature, high-pressure steam will be a value lying preferably in a range of between about $9.81 \times 10^5$ and $29.4 \times 10^5$ Pa (between 10 and 30 kgf/cm$^2$), more preferably between about $14.7 \times 10^5$ and $24.5 \times 10^5$ Pa (between 15 and 25 kgf/cm$^2$), and still more preferably between about $17.7 \times 10^5$ and $21.6 \times 10^5$ Pa (between 18 and 22 kgf/cm$^2$). If the pressure inside the vessel 20 should rise more than necessary during this decomposition treatment, by performing automatic control based on sensor values from the pressure sensor and releasing steam from the safety valve 73, adjustments may be made so as to maintain the pressure inside the vessel 20 at a value within the aforementioned range. Since a silencer and odor eliminator are provided at the atmosphere-venting end of the safety valve 73, environmental problems may be avoided, and safe operation can be assured.

By means of the evacuation procedure of the inside of the vessel 20 carried out prior to this organic waste 18 decomposition treatment, treatment can be carried out under conditions in which air trapped in the organic waste 18 has been expelled from the organic waste 18 and also from the interior of the vessel 20; thus the temperature in interior of the vessel 20 may be more efficiently raised to that of the high-temperature, high-pressure steam, as compared to the case where high-temperature, high-pressure steam is injected into the vessel 20 without first performing an evacuation procedure for example. Thus, more adequate decomposition treatment of the organic waste 18 may be carried out reliably, and more rapidly as well.

Additionally, because the vessel 20 is positioned on the horizontal during decomposition treatment of the organic waste 18 carried out by this procedure, the inside peripheral face of the round tubular chassis portion 28 which constitutes the bottom face of the vessel 20 is also positioned extending in the horizontal direction. Thus, situations in which the organic waste 18 inside the vessel 20 experiences partial shifting inside the vessel 20 due to stirring by the plurality of rotating blades 98 are eliminated, and difficulty in stirring resulting therefrom will not occur. Further, since this organic waste 18 decomposition treatment does not involve any incineration of the organic waste 18, no $CO_2$, which is a problem greenhouse gas, is produced during treatment, nor are any toxic substances such as toxic gases or dioxins emitted; and since treatment takes place under conditions of high temperature and pressure, microbial decomposing action is not required, so the foul odors associated with putrefying bacteria are not produced.

This decomposition treatment is carried out continuously for between about 30 and 60 minutes, and in most cases between about 40 and 50 minutes, and is terminated at the point that this time interval has elapsed. Hydrolysis and pyrolysis of the organic waste 18 inside the vessel 20 is brought to completion thereby. Here, this decomposition treatment time will be the time needed for hydrolysis and pyrolysis of the organic waste 18 inside the vessel 20 to reach completion, and may be adjusted appropriately depending on various factors such as the condition of the material being treated or the treatment temperature and humidity, and no particular limitation is imposed thereon. Treatment may be carried out successively and continuously, or intermittently and at intervals. Once the decomposition treatment has been terminated, the on-off valve (not shown) on the exhaust pipe 76 is opened, and all of the high-temperature, high-pressure steam is released to the outside from the exhaust pipe 76, so the inside of the vessel 20 is temporarily returned to atmospheric pressure.

Because the organic waste 18 that undergoes decomposition treatment in this way has been treated under conditions of high temperature and pressure, it is sterile, and moreover any seeds, bulbs, rhizomes and so on will have been completely killed during treatment; further, various types of substances contained in the organic waste 18 will have smaller molecules due to having undergone hydrolysis and pyrolysis. Thus, the organic waste 18 decomposition product will contain nutrients such as proteins, carbohydrates, fats and the like in the form of amino acids, various sugars, fatty acids, and so on, so the organic waste 18 decomposition product will be absorbed with exceptional efficiency by livestock and plants, and moreover will allow microbes that are useful to plants or animals to proliferate easily, making it advantageous for use as a high-quality organic material such as a feed, fertilizer, or soil amendment.

Here, following decomposition treatment as described above, a vacuum drying treatment is performed on the organic waste 18 decomposition product; first, the on-off valve on the exhaust pipe 76 and the on-off valve on the steam injection pipe 62 are closed and the vessel 20 interior is again hermetically sealed, while the on-off valve on the branch pipe 77 is opened. In this state, the evacuation pump 80 is again operated to suck out the air inside the vessel 20 through the branch pipe 77 of the exhaust pipe 76, and reducing pressure in the vessel 20 interior to essentially vacuum conditions.

Preferably, the evacuation procedure here will continue until the pressure inside the vessel 20 has been reduced to about $8 \times 10^3$ Pa (60 Torr) or below, more preferably about $2.5 \times 10^3$ Pa (20 Ton) or below, and still more preferably about $8 \times 10^2$ Pa (6 Ton). The minimum pressure value (lower limit value) for evacuation will be substantially constrained by apparatus and equipment parameters, and no particular limitation is imposed thereon in the present invention; however, a value of about $4 \times 10^2$ Pa (3 Ton) would be practical. Once the pressure inside the vessel 20 has reached a value within such a range, the on-off valve on the branch pipe 77 is closed to maintain the reduced-pressure state. During this evacuation procedure, the rotating shaft 82 and the rotating blades 98 continue to rotate through driving by the drive motor 92, and stir the organic waste 18 inside the vessel 20. In the present embodiment, by employing a water seal vacuum pump as the evacuation pump 80 and attaching an ejector, evacuation of the vessel 20 interior down to about $8 \times 10^2$ Pa (6 Torr) is achieved. The theoretical boiling point of water under such reduced pressure conditions of $8 \times 10^2$ Pa (6 Torr) is 45° C., and thus the drying process described below may be carried out favorably.

Simultaneously with this evacuation procedure, or before or after the evacuation procedure, the on-off valve on the steam supply pipe 68 is opened, and high-temperature, high-pressure steam conducted into the steam flow line 66 from the steam generator unit 64 is supplied from the steam supply pipe 68 to the interior of the jacket portion 24 to fill it. The entire outside peripheral face of the chassis portion 28 of the vessel 20, as well as the organic waste 18 decomposition product held inside the vessel 20, are thereby heated from the outside.

In this way, the organic waste 18 decomposition product inside the vessel 20 is heated under vacuum conditions, and vacuum drying treatment is carried out on the decomposition product. In the present embodiment, high-temperature, high-pressure steam at 0.5 MPa, 150° C. is introduced into the jacket portion 24. As noted, in the present embodiment, the interior of the vessel 20 is evacuated to about $8 \times 10^2$ Pa (6 Torr), a condition under which water boils at about 45° C., and thus the moisture contained in the decomposition product can be easily evaporated out through heating of the vessel 20 by steam introduced into the jacket portion 24.

This vacuum drying treatment is then carried out continuously for a prescribed period of time, and is then terminated once this prescribed time period has elapsed. This time period for the drying process may be established and modified appropriately depending on the type of organic waste 18 being treated, the water content of the treated product at the point in time that hydrolysis is terminated, and other factors. Through appropriate establishment of a drying treatment time, it will be possible to select a desired form for the final treated product, such as powder or liquid form. As an example, where the organic waste 18 consisting of oyster shells is subjected to decomposition treatment, by employing a sufficiently lengthy drying treatment time to bring about complete drying of the decomposition product, a calcium powder in which calcium in the oyster shells has precipitated can be predominantly obtained as the final treated product. Or, by stopping the drying treatment midway and removing the material from the treatment apparatus while there is still some moisture remaining, there may be obtained a final treated product of aqueous solution form containing high levels of calcium, which may be used as-is as liquid fertilizer or the like.

The organic waste 18 decomposition product held inside the vessel 20 undergoes vacuum drying while still being held in the vessel 20, rather than being transferred to another vessel. The final treated product is obtained through decomposition treatment through hydrolysis and pyrolysis and vacuum drying treatment of the organic waste 18, carried out in that order in succession. Optionally, the system may subsequently be left for a prescribed time period for the vessel 20 to allow the organic waste 18 final treated product obtained therein to cool down. In preferred practice, the final treated product (organic waste 18) will continue to be stirred by rotation of the rotating blades 98 during this cool-down procedure.

Next, the ball valve 50 of the discharge duct 48 is opened. The organic waste 18 final treated product which has undergone decomposition treatment and vacuum drying treatment is thereby discharged to the outside through the discharge port 40, whereby a prescribed volume of the organic waste 18 final treated product may be reliably obtained. At this time, by operating the drive motor 92 in reverse in order to rotate the rotating shaft 82 and the rotating blades 98 in reverse for example, organic waste 18 final treated product which had been held at the left and right ends inside the vessel 20 may be shifted by the rotating blades 98 so that the material is collected towards the center. By so doing, the entire amount of the final treated product inside the vessel 20 may be quickly and easily removed through the discharge port 40.

The organic waste 18 final treated product obtained in this way is not organic waste 18 that has simply undergone vacuum drying directly, but is rather material that has undergone vacuum drying in a condition of having first been broken down into smaller molecules through decomposition treatment, and thus even if the organic waste 18 being treated is waste that contains materials difficult to dry by direct vacuum drying alone, e.g. highly moisture-retaining products such as seaweed (e.g. kelp) or fermented soybeans, synthetic polymer compounds in shampoos, detergents and the like, dairy products such as milk, high fat foods such as fish with high fat content, or products with high starch content, the waste may be obtained in completely dried form nonetheless. Particularly where the organic waste 18 consists of shells of crustaceans, shellfish, kelp or the like, the final treated product may be obtained in the form of a powder of chitosan or natural calcium, and thereby obtained in the form of a more useful resource.

By breaking down molecules through decomposition treatment prior to vacuum drying, the final treated product of the organic waste 18 may be obtained in forms that are sufficiently smaller or finer than forms that would be obtained through simple elimination of moisture from the untreated organic waste 18, for example, in granule or powder forms. Consequently, the need for crushing or milling of the organic waste 18 by a crushing or milling machine before or after vacuum drying will be eliminated. Moreover, through vacuum drying as described above, decomposition products of, for example, liquid or gel form obtained through decomposition treatment of the organic waste 18 as described above may also be obtained in powder form for example.

Further, as mentioned previously, decomposition products having exceptional efficiency of absorption by livestock and plants and allowing microbes that are useful to plants or animals to proliferate easily may be obtained in granular or powder form without crushing or milling by a crushing or milling machine as described above, whereby final treated products of organic waste 18 may be advantageously obtained as organic materials of high quality and which are moreover highly suited for consumption by livestock or for application to farmland. Where the final treated product of organic waste 18 is to be employed as an organic material for a particular application, it will be a simple matter to obtain a treated product optimal for the application for which it will be used, simply by appropriately modifying composition of the organic waste 18 being treated, for example.

From the above description it will be appreciated that, in the present embodiment, organic waste 18 can undergo decomposition treatment and vacuum drying treatment successively within a single vessel 20, with the organic waste 18 still held inside the vessel 20 and without being transferred to another vessel etc. For this reason, in contrast to the case where decomposition treatment and vacuum drying treatment of organic waste 18 are carried out in separate units, the labor entailed in transferring the organic waste 18 between two units is eliminated, so that operational efficiency of the treatment operations may be effectively improved.

Additionally, because the organic waste 18 that is already heated through decomposition treatment involving contact with high-temperature, high-pressure steam is then subjected as-is to vacuum drying treatment, heating of the organic waste 18 for the purpose of vacuum drying treatment can take place more quickly and efficiently. Consequently, reductions in the prescribed time period from start of the decomposition treatment to completion of the vacuum drying treatment to a level not possible to achieve where the decomposition treatment and the vacuum drying treatment are carried out in two different units can be achieved in an exceedingly advantageous manner. Moreover, as compared to the case where two different units, namely a decomposition treatment unit and a vacuum drying treatment unit, are employed, it will be possible to effectively achieve reductions in organic waste treatment costs and the cost of manufacture of the equipment per se, as well as to reduce space requirements for installation of the equipment.

Moreover, in the present embodiment, the organic waste 18, while being kept under high temperature conditions, is prevented from contact with the air from the start of the decomposition treatment to the end of the vacuum drying treatment inside a single vessel 20. Thus, not only can any pathogens, bacteria, viruses or the like that are present in the organic waste 18 be killed thoroughly and reliably during treatment, but contamination of the product by pathogens, bacteria, viruses or the like during transition from the decomposition treatment to the vacuum drying treatment can be avoided before it occurs. Thus, quality can be improved further where the final treated product will be used as feed or fertilizer.

Consequently, according to the present embodiment, by carrying out successive decomposition treatment and vacuum drying treatment of organic waste 18 within a single vessel 20, the organic waste 18 regardless of type thereof can be treated advantageously through a simple, low-cost operation to obtain treated products having sufficiently reduced volume and ease of handling; and the final treated products will be very advantageous for use as a high-quality organic material such as feed, fertilizer, or soil amendment.

Also, in the present embodiment, the jacket portion 24 is provided between the vessel 20 and the cover vessel 22 which is disposed to the outside thereof and covers it in its entirety, with the interior of the jacket portion 24 being filled with high-temperature, high-pressure steam so as to heat from the outside both the vessel 20 and the organic waste 18 held in its interior, whereby the entire interior of the vessel 20 may be effectively utilized as space for holding the organic waste 18; and as compared to the case where the organic waste 18 inside the vessel 20 is heated using a boiler or electric heater for example, the entire mass of the organic waste 18 can be heated uniformly and without any unevenness, and the amount of fuel required for heating can be reduced so as to advantageously achieve associated reductions in cost and in carbon dioxide emitted in association with burning of fuel.

While the specific constitution of the present invention has been described in detail above, this description is merely exemplary, and the invention is not limited in any way by the disclosure hereinabove.

For example, a mechanism for introducing a cooling fluid into the jacket portion 24 could be provided separately from the mechanism for supplying high-temperature, high-pressure steam to the interior of the jacket portion 24. By so doing, a cooling fluid (cooling medium) such as coolant or the like could be supplied to the jacket portion 24 interior during cooling of the organic waste 18 subsequent to vacuum drying treatment of the organic waste 18, so that the vessel 20 can be cooled from the outside, to force-cool the organic waste 18 inside the vessel 20.

Also, whereas in the embodiment above, the decomposition treatment that is performed on the organic waste 18 inside the vessel 20 is carried out until hydrolysis and pyrolysis of the organic waste 18 go to completion, and vacuum drying treatment is then performed on the organic waste 18 decomposition product, it would be possible for example to instead terminate decomposition treatment of the organic waste 18 while still incomplete, that is, prior to completion of hydrolysis and pyrolysis of the organic waste 18, and to then perform vacuum drying treatment on the organic waste 18 (incomplete decomposition product). Such incomplete decomposition treatment of the organic waste 18 can be accomplished easily, for example, by opening the on-off valve of the exhaust pipe 76 at a some point in time after hydrolysis and pyrolysis of the organic waste 18 have started but are not yet complete, in order to discharge the high-temperature, high-pressure steam inside the vessel 20 to the outside through the exhaust pipe 76, thus halting hydrolysis and pyrolysis of the organic waste 18 at midpoint.

By so doing, by way of the final treated product produced through successive decomposition treatment and vacuum drying treatment of organic waste 18 it will be possible to obtain a dried product in which macromolecules partially remain in their original form, so that the final treated product can be rendered into clumps or granules of relatively large size for example. It will be possible thereby for the final treated product to be reused effectively as feed for large livestock, for example. That is, by changing the timing for venting of the high-temperature, high-pressure steam inside the vessel 20 it is possible to give the final treated product any desired size.

In the preceding embodiment, decomposition treatment and vacuum drying treatment of the organic waste 18 were carried out in succession inside the vessel 20, but it would instead be possible, for example, to perform only decomposition treatment through hydrolysis and pyrolysis of the organic waste 18 in the vessel 20, and to then immediately discharge the organic waste 18 inside the vessel 20 through the discharge port 40 without evacuating the interior of the vessel 20 or supplying high-temperature, high-pressure steam into the jacket portion 24, to obtain an organic waste 18 decomposition product. Alternatively, it would be possible after placing the organic waste 18 in the vessel 20 to then immediately evacuate the interior of the vessel 20 and supply high-temperature, high-pressure steam into the jacket portion 24 without supplying high-temperature, high-pressure steam to the vessel 20 interior so that the organic waste 18 inside the vessel 20 does not undergo any decomposition treatment whatsoever, in order to carry out vacuum drying treatment only. In this way, the treatment apparatus 8 of the preceding embodiment can be used to selectively perform either decomposition treatment or vacuum drying treatment of organic waste 18 inside the vessel 20, thus making it serviceable in a versatile manner as an apparatus for carrying out either decomposition treatment or vacuum drying treatment of organic waste 18, or as an apparatus for carrying out both treatments, and affording enhanced usability.

Further, whereas in the treatment apparatus 8 of the preceding embodiment the introduction port 38 and the discharge port 40 have been provided in a center zone of the chassis portion 28 of the vessel 20, it would be acceptable for example to instead locate the introduction port 38 in a zone at either the left or right end of the chassis portion 28 of the vessel 20, and to locate the discharge port 40 at the opposite end from the side where the introduction port 38 is formed. In this case, it will be preferable to adopt a design whereby the twist direction etc. of the rotating blades 98 attached to the rotating shaft 82 is adjusted so that organic waste 18 inside the vessel 20 will be shifted from the introduction port 38 side to the discharge port 40 side through rotation of the rotating blades 98. Also, it will be preferable to additionally provide the container unit 12 with a tilting mechanism like that taught in JP-A 2007-21410 adapted to lift the introduction port 38 end of the vessel 20 upward, so that organic waste 18 inside the vessel 20 will be discharged from the discharge port 40 once the vessel 20 of the container unit 12 has been tilted by this tilting mechanism. By so doing, discharge of the organic waste 18 from the discharge port 40 can take place even more smoothly under the weight of the organic waste 18 itself.

Figure 5:
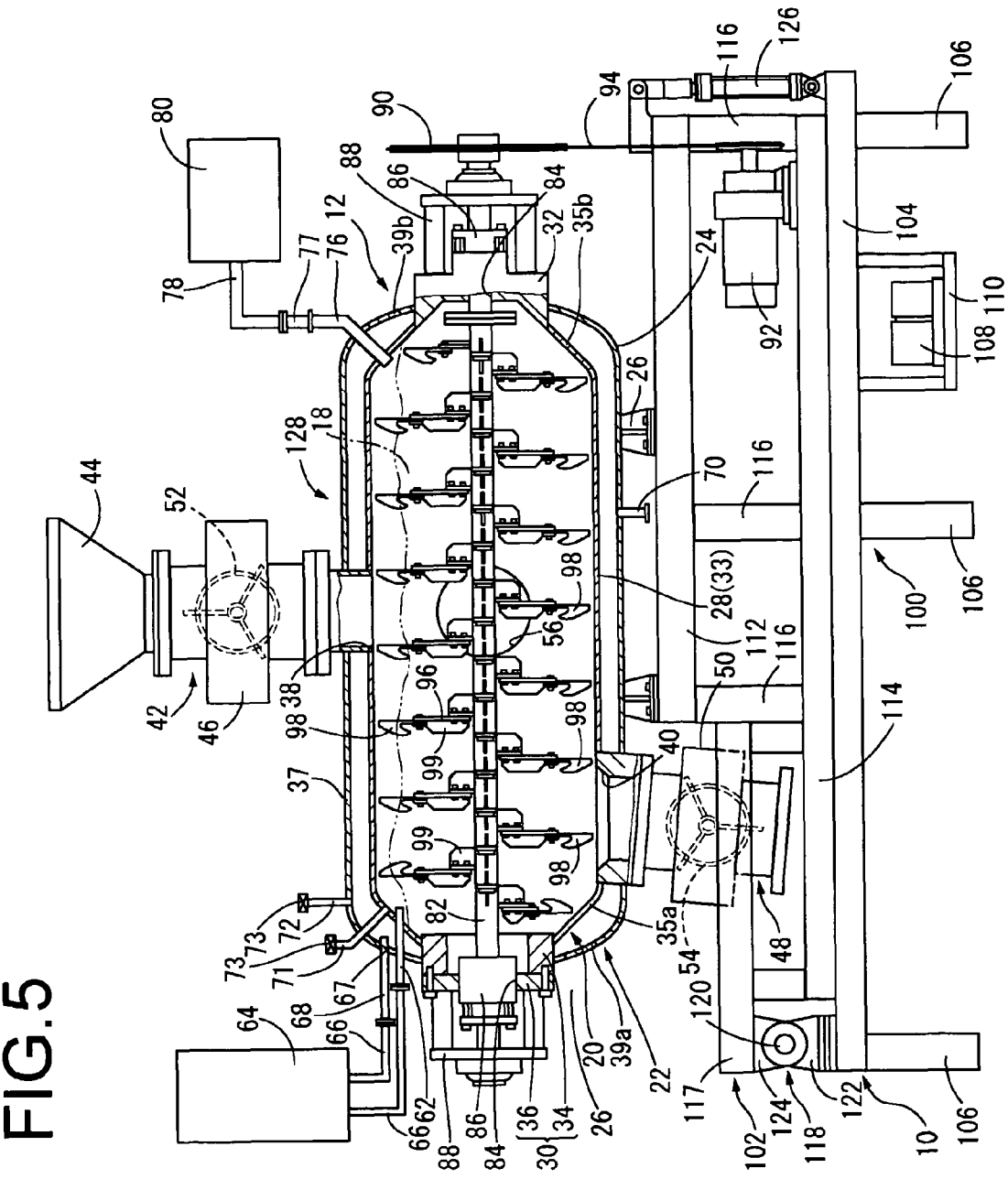
FIG. 5 It is a front view depicting another embodiment of an organic waste treatment apparatus according to the invention, including a partially cutaway view.

Specifically, as depicted in FIG. 5, the base 10 is composed of a fixed frame 100 installed disposed on the horizontal, and a tilting frame 102 tiltably disposed on this fixed frame 100. The fixed frame 100 is composed of a support rack portion 104 of elongated rectangular shape extending along the horizontal; and six leg portions 106 disposed on the perpendicular from the bottom face of this support rack portion 104. A hydraulic unit 108 is mounted via a mounting frame 110 onto the support rack portion 104 of the fixed frame 100.

Meanwhile, the tilting frame 102 has an upper support rack portion 112 and a lower support rack portion 114 of elongated rectangular shape extending on the horizontal, and spaced vertically apart from one another by a prescribed distance; and a plurality of connector post portions 116 (here, six are provided) positioned extending on the vertical between the upper and lower support rack portions 112, 114 and connecting them to one another.

The lower support rack portion 114 rests on the support rack portion 104 of the fixed frame 100; and a connecting rack portion 117, which is connected to the pair of connector post portions 116, 116 that are situated at a lengthwise edge (the left side in FIG. 5) and to the lower support rack portion 114, is connected at a lengthwise edge thereof (the left side in FIG. 5) to the fixed frame 100 via a rotation mechanism 118 whereby the tilting frame 102 as a whole is positioned on the horizontal on the fixed frame 100. This rotation mechanism 118 has a rotating shaft 120 that extends orthogonally to the lengthwise direction of the connecting rack portion 117 (i.e. perpendicular to the plane of the page in FIG. 5); a support portion 122 anchored to the fixed frame 100 and adapted to support the rotating shaft 120; and a connecting portion 124 anchored to the bottom face of the connecting rack portion 117 and rotatably connected to the rotating shaft 120.

Between the other lengthwise edge of the upper support rack portion 112 (the edge on the opposite side from that where the rotation mechanism 118 is located) and the support rack portion 104 of the fixed frame 100 a hydraulic cylinder mechanism 126, which is adapted to extend and retract through actuation by the hydraulic unit 108 provided on the fixed frame 100, is disposed so as to extend on the vertical. This hydraulic cylinder mechanism 126 is arranged with the bottom end of the cylinder mounted to the support rack portion 104 of the fixed frame 100 so as to be rotatable about an axis of rotation extending orthogonal to the lengthwise direction of the support rack portion 104; and with the distal end of the piston rod that extends up from the cylinder secured to the upper support rack portion 112 of the tilting frame 102.

Figure 6:
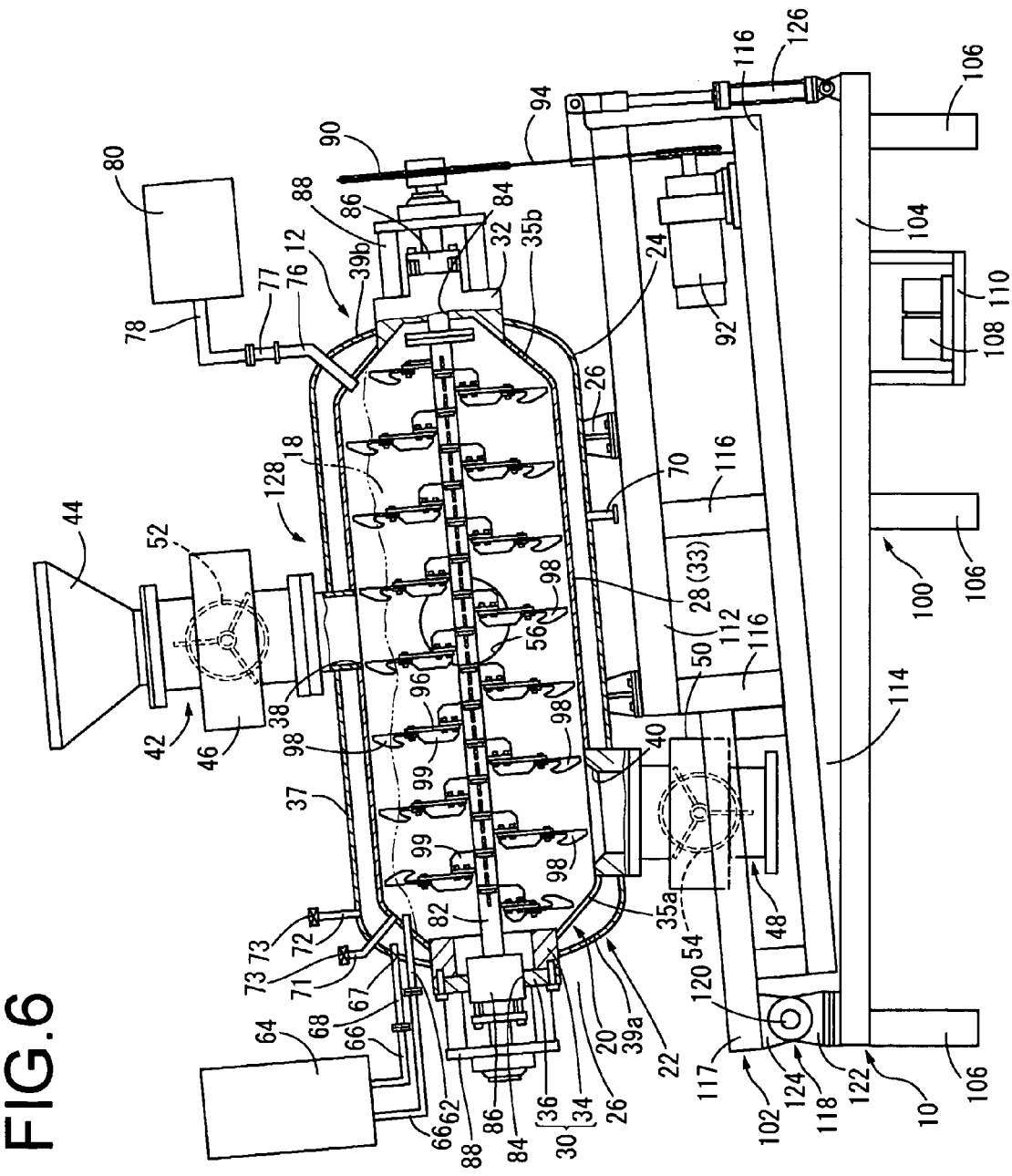
FIG. 6 It is a front view depicting the organic waste treatment apparatus with its tilting frame in the tilted state, and including a partially cutaway view.

Thus, during non-operation of the hydraulic cylinder mechanism 126 while in the retracted position, the tilting frame 102 rests in the horizontal position, whereas extension of the hydraulic cylinder mechanism 126 through actuation by the hydraulic unit 108 is accompanied by upward pushing of the tilting frame 102 at the hydraulic cylinder mechanism 126 end thereof (the right side in FIG. 5). The tilting frame 102 will thereby be caused to rotate about the rotating shaft 120 of the rotation mechanism 118 as depicted in FIG. 6, causing it to tilt and incline downward from the end where the hydraulic cylinder mechanism 126 is attached (the right side in FIG. 5) towards the end where the rotation mechanism 118 is located (the left side in FIG. 5). By subsequently retracting the hydraulic cylinder mechanism 126 from this position, the tilting frame 102 will be returned to its original horizontal position prior to having been tilted.

By virtue of being secured to the upper support rack portion 112 of the tilting frame 102, during non-operation of the hydraulic cylinder mechanism 126 in the retracted position, the container unit 12 will rest in the horizontal position, whereas tilting of the tilting frame 102 through extension of the hydraulic cylinder mechanism 126 will be accompanied by tilting of the unit so that the unit inclines downward from the right end side towards the left end side. By subsequently returning the tilting frame 102 to the horizontal position by retracting the hydraulic cylinder mechanism 126, the unit will be returned to its original horizontal position prior to having been tilted.

The vessel 20 which constitutes part of this container unit 12 is provided in its tubular portion 33 with an introduction port 38 that opens upward, and in the lower zone at the left end of the tubular portion 33 with a discharge port 40 that opens downward. In other words, the discharge port 40 is disposed at the end towards the side that is positioned on the lower side when the container unit 12 tilts in association with tilting of the tilting frame 102 through extension of the hydraulic cylinder mechanism 126 as described above. That is, the container unit 12 is adapted to be switched by the hydraulic cylinder mechanism 126 and the tilting frame 102, between a position extending on the horizontal and a position with the discharge port 40 inclined downward. From the above it will be appreciated that, here, the position switching means include the hydraulic cylinder mechanism 126 and the tilting frame 102.

For ease of understanding, in FIGS. 5 and 6 components and parts similar in construction to those in the preceding embodiment have been assigned like symbols. In the organic waste treatment apparatus 128 depicted in FIGS. 5 and 6, a ball valve 46 constitutes a lid for hermetic closure of the introduction port 38, and a ball valve 50 constitutes a lid for hermetic closure of the discharge port 40.

The stirring means, steam supply means, heating means, and pressure-reducing means are in no way limited to the specific constructions shown herein by way of example, and those having other known constructions may be employed as well.

For example, in place of, or in addition to, the heating means shown by way of example, there could be employed a burner unit designed to heat the vessel 20 directly from the outside; or an electric heater such as a band heater coiled around the vessel 20. Also, the jacket portion 24 may be supplied with hot water or the like, instead of high-temperature, high-pressure steam.

It will be recognized by those skilled in the art that many modifications, adjustments and improvements of the present invention which need not be described one by one herein are possible without departing from the scope and spirit of this invention.

The invention claimed is:

1. An apparatus for treating organic waste comprising:
a vessel having a hermetically sealable introduction port and discharge port, and adapted to hold organic waste introduced therein through the introduction port;
stirring means adapted to stir the organic waste held in the vessel;
steam supply means for supplying high-temperature, high-pressure steam to the vessel;
heating means adapted to heat the organic waste held in the vessel; and
evacuation means adapted to evacuate the vessel, under conditions where the organic waste is held inside the vessel and the introduction port and discharge port are hermetically sealed;
the apparatus being constituted to be able to carry out selectively either decomposition treatment whereby the organic waste held in the hermetically sealed vessel is brought into contact with the high-temperature, high-pressure steam to bring about hydrolysis and pyrolysis while being stirred, or vacuum drying treatment whereby with the hermetically sealed vessel interior having been evacuated the organic waste held in the hermetically sealed vessel is heated and dried while being stirred; and to be able to carry out both the decomposition treatment and the vacuum drying treatment in succession.

2. The apparatus for treating organic waste according to claim 1, further comprising steam venting means adapted to vent to an outside the high-temperature, high-pressure steam which has been supplied to the vessel interior by the steam supply means.

3. The apparatus for treating organic waste according to claim 1, wherein with the organic waste held inside the vessel and the introduction port and discharge port hermetically sealed, the evacuation means is able to evacuate the vessel interior prior to supplying the high-temperature, high-pressure steam to the vessel interior by the steam supply means.

4. The apparatus for treating organic waste according to claim 1, wherein the heating means is adapted to heat the organic waste held in the vessel by heating the vessel from an outside.

5. The apparatus for treating organic waste according to claim 4, wherein the heating means includes a cover vessel positioned enclosing an entire perimeter of the vessel so as to define a hermetic space around an outside face of the vessel; and a heating medium supply mechanism whereby a heating medium that is adapted to contact the outside face of the vessel and heat the vessel is supplied to the hermetic space between the cover vessel and the vessel through a supply port provided to the cover vessel.

6. The apparatus for treating organic waste according to claim 5, wherein water vapor is used as the heating medium.

7. The apparatus for treating organic waste according to claim 1, wherein the vessel has a round tubular chassis that extends in a horizontal direction, with the introduction port opening upward in the round tubular chassis of the vessel and being hermetically closeable by a lid and with the discharge port opening downward at an axial end of the round tubular chassis and hermetically closeable by a lid; and is additionally furnished with position switching means adapted to switch positions of the vessel between a position in which the round tubular chassis extends on the horizontal, and a position in which the round tubular chassis is inclined downward towards the discharge port end.

8. A method for treating organic waste, comprising the steps of:
   placing organic waste inside a hermetically sealable vessel;
   carrying out decomposition treatment through hydrolysis and pyrolysis of the organic waste by supplying high-temperature, high-pressure steam to the hermetically sealed vessel interior and bringing about contact between the organic waste and the high-temperature, high-pressure steam, as the organic waste held in the vessel interior is being stirred; and
   carrying out vacuum drying treatment by first evacuating the interior of the hermetically sealed vessel that holds the organic waste having undergone the decomposition treatment, then heating and drying as the organic waste inside the vessel is stirred.

9. The method for treating organic waste according to claim 8, further comprising the step of evacuating the vessel interior after the organic waste has been placed in the vessel interior, and before supplying the high-temperature, high-pressure steam to the hermetically sealed vessel interior.

10. The method for treating organic waste according to claim 8, wherein subsequent to termination of the decomposition treatment of the organic waste upon hydrolysis and pyrolysis of the organic waste having gone to completion, a vacuum drying process is carried out on the decomposed organic waste.

11. The method for treating organic waste according to claim 8, wherein after terminating the decomposition treatment of the organic waste at any point in time prior to hydrolysis and pyrolysis of the organic waste having gone to completion, the vacuum drying process is carried out on the decomposed organic waste.

12. An organic material comprising a vacuum dried product obtained by the organic waste treatment method comprising the steps of:
   placing organic waste inside a hermetically sealable vessel;
   carrying out decomposition treatment through hydrolysis and pyrolysis of the organic waste by supplying high-temperature, high-pressure steam to the hermetically sealed vessel interior and bringing about contact between the organic waste and the high-temperature, high-pressure steam, as the organic waste held in the vessel interior is being stirred; and
   carrying out vacuum drying treatment by first evacuating the interior of the hermetically sealed vessel that hold the organic waste having undergone the decomposition treatment, then heating and drying as the organic waste inside the vessel is stirred.

* * * * *